United States Patent Office 2,761,762
Patented Sept. 4, 1956

2,761,762

PRODUCTION OF GAS CONTAINING SULFUR DIOXIDE

Adolf Johannsen, Ludwigshafen (Rhine), Willi Danz, Ludwigshafen (Rhine)-Oggersheim, Wilhelm Pfannmueller, Mannheim, and Herbert Wolf, Ludwigshafen (Rhine), Germany, assignors to Badische Anilin- & Soda-Fabrik Aktiengesellschaft, Ludwigshafen (Rhine), Germany No Drawing. Application February 19, 1952, Serial No. 272,506

Claims priority, application Germany March 6, 1951

2 Claims. (Cl. 23—177)

This invention relates to the production of gases containing sulfur dioxide by roasting comminuted sulfur minerals.

An advantageous method of roasting sufur minerals having a grain size predominantly within the range of 0.1 to 10 millimeters has already been described by us in our copending application Serial No. 192,374, filed October 26, 1950, according to which the minerals are supplied to a layer in random turbulent motion, the said layer consisting of substantially roasted material, being kept at the roasting temperature and being traversed in an upward direction by oxygen-containing gases in an amount sufficient to maintain the turbulent motion. In order to avoid exceeding the permissible roasting temperature in the said process there may be added to the turbulent layer cold roasted ore of the sulfur minerals to be processed or other inert substances or also solid substances which split off sulfur dioxide by an endothermic reaction.

We have now found that in the roasting of sulfur minerals of which the grain size is too coarse for the formation of a uniform turbulent motion, for example of a grain size up to about 12 millimeters, and in particular in the case of materials in which the constituents having a grain size above about 6 millimeters strongly predominate, it is possible to maintain a turbulent motion in the layer sufficient for carrying out the roasting process by introducing into the layer, simultaneously with the said coarse-grained material, other solid substances which do not soften at the roasting temperature and which are of finer grain or which disintegrate during the turbulent motion.

Generally speaking it is advantageous to employ additional substances which mainly have a grain size of less than about 3 millimeters. By this measure it is possible to roast by the turbulent layer process coarse sulfur minerals with which otherwise difficulties might occur by reason of agglomeration and slag formation. As additional substances there may be mentioned in particular the fine-grained roasted ore such as is formed in the turbulent layer by decrepitation and attrition from the initially introduced sulfur minerals and which is in part carried away from the turbulent layer as flue dust by the roaster gases. It is, however, also possible to add other inert substances which do not soften at the roasting temperature, or substances which give off sufur dioxide by an endothermic reaction without softening, as for example the sulfates of iron, magnesium or calcium, or which themselves contain sulfur which is capable of being roasted out, as for example fine-grained flotation pyrites or gas purification masses.

The return of the fine-grained roasted ore can advantageously be effected by arranging above the turbulent layer a quiescent zone the height of which is at least about four times that of the turbulent layer and the cross-section of which preferably widens upwardly. Such quiescent zones may be used with turbulent layer furnaces of any cross-section, as for example circular, elliptical, annular or polygonal. Upon leaving the turbulent layer, the reaction gases undergo a reduction in speed, which is accentuated by conical construction of the quiescent zone, so that the entrained particles in the ascending gas stream gradually lose their upwardly directed speed in consequence of the counteracting force of gravitation and fall back into the turbulent layer.

It is also possible, however, to use the flue dust which has been entrained by the reaction gases and deposited in dust chambers, cyclones or the like, this being returned to the turbulent layer by free fall or by conveyer devices; it has been found to be preferable to introduce it into the lower part of the turbulent layer near to its bottom surface and the grate through which the oxygen-containing gas is introduced. In this way a constant loosening of the coarse-grained material which becomes enriched in the lower parts of the layer is effected and the formation of the turbulent motion thus facilitated. The flue dust entrained by the reaction gases has a grain size mainly below 2 millimeters. If it is reintroduced into the turbulent layer, by reason of the large surface development of these fine-grained particles in comparison with their small weight there is imparted thereto by the upwardly flowing gases a quantity of motion opposed to the force of gravitation. These upwardly directed fine particles transmit, in collision with the coarse solid particles (which cannot be directly carried up by the gases themselves by reason of their small surface development relatively to their weight), a motion impulse which is sufficient to effect temporarily a vertically upwardly directed motion to even the coarse particles and thus to initiate a random turbulent motion of the particles under the counteraction of the force of gravitation.

Instead of, or together with, the flue dust, there may also be reintroduced those fine portions of the roasted ore which are directly removed from the turbulent layer, for example through an overflow, and from which if necessary the coarse-grained portion may be separated.

Cooling of the roasted ore before its return into the turbulent layer is neither necessary nor preferable provided that heat-absorbing members are provided in the turbulent layer for the utilisation of the roasting heat for the recovery of energy.

What we claim is:

1. In a process for the production of gases containing sulfur dioxide by roasting comminuted sulfur minerals with oxygen-containing gases in a layer of substantially roasted material kept in random turbulent motion within the confines of the layer by the said gases, the improvement which comprises feeding into the turbulent layer sulfur minerals having a grain size of up to about 12 millimeters and a predominating grain size of above about 6 millimeters, and simultaneously introducing into the lower part of the turbulent layer near the bottom surface thereof roasted ore particles previously removed from the layer and which have a grain size of less than about 3 millimeters to facilitate the turbulent motion.

2. In a process for the production of gases containing sulfur dioxide by roasting comminuted sulfur minerals with oxygen-containing gases in a layer of substantially roasted material kept in random turbulent motion within the confines of the layer by the said gases, the improvement which comprises feeding into the turbulent layer sulfur minerals having a grain size of up to about 12 millimeters and a predominating grain size of above about 6 millimeters, and simultaneously introducing into the lower part of the turbulent layer near the bottom surface thereof roasted ore dust deposited from the roaster gases and which has a grain size of less than about 3 millimeters to facilitate the turbulent motion.

References Cited in the file of this patent

UNITED STATES PATENTS

| | | |
|---|---|---|
| 212,508 | Robinson | Feb. 8, 1879 |
| 2,376,564 | Upham | May 22, 1945 |
| 2,471,119 | Peck | May 24, 1949 |
| 2,480,670 | Peck | Aug. 30, 1949 |
| 2,586,818 | Harms | Feb. 26, 1952 |
| 2,591,595 | Orgozaly | Apr. 1, 1952 |
| 2,617,708 | Perry | Nov. 11, 1952 |
| 2,621,118 | Cyr | Dec. 9, 1952 |
| 2,625,464 | Roberts | Jan. 13, 1953 |
| 2,637,629 | Lewis | May 5, 1953 |

OTHER REFERENCES

Coke and Gas, London, Westminster S. W. 1, February 1949, pages 64–68.